(12) United States Patent
Manley

(10) Patent No.: US 6,478,457 B1
(45) Date of Patent: Nov. 12, 2002

(54) MOVABLE VEHICLE HEADLIGHT SYSTEM

(76) Inventor: Richard W. Manley, 306 Plumcrest Ct., Oakdake, CA (US) 95361

( * ) Notice: Subject to any disclaimer, the term of this patent is extended or adjusted under 35 U.S.C. 154(b) by 118 days.

(21) Appl. No.: 09/663,159

(22) Filed: Sep. 15, 2000

(51) Int. Cl.7 .................................................. B60Q 1/04
(52) U.S. Cl. ........................ 362/465; 362/525; 362/275; 362/419
(58) Field of Search ................................. 362/271, 272, 362/286, 289, 420, 421, 425, 428, 419, 465, 466, 467, 525, 526, 528, 538, 543, 275

(56) References Cited

U.S. PATENT DOCUMENTS

| | | | |
|---|---|---|---|
| 1,418,769 A | * | 6/1922 | Woodford ................... 362/286 |
| 3,947,680 A | | 3/1976 | Cadiou |
| 4,943,893 A | | 7/1990 | Shibata et al. |
| 5,099,400 A | | 3/1992 | Lee |
| 5,195,816 A | * | 3/1993 | Moss, Jr. et al. ........... 362/420 |
| 5,416,465 A | | 5/1995 | Lin |
| 5,580,148 A | * | 12/1996 | Liao ........................... 362/465 |
| 5,868,488 A | | 2/1999 | Speak et al. |
| 5,909,949 A | | 6/1999 | Gotoh |
| 5,957,563 A | * | 9/1999 | Moore ........................ 362/525 |

* cited by examiner

Primary Examiner—Y. My Quach-Lee

(57) ABSTRACT

A movable vehicle headlight system for automatically aiming the headlights in the direction of travel regardless of the terrain of the road. The movable vehicle headlight system includes base assemblies each including a base member; and also includes headlight assemblies each including a headlight frame being securely mounted upon the base assembly and each including a headlight being pivotally mounted to the headlight frame; and further includes headlight drive assemblies for pivoting the headlight according to a terrain of a road being driven upon; and also includes a control unit assembly for controlling the headlight drive assemblies.

18 Claims, 3 Drawing Sheets

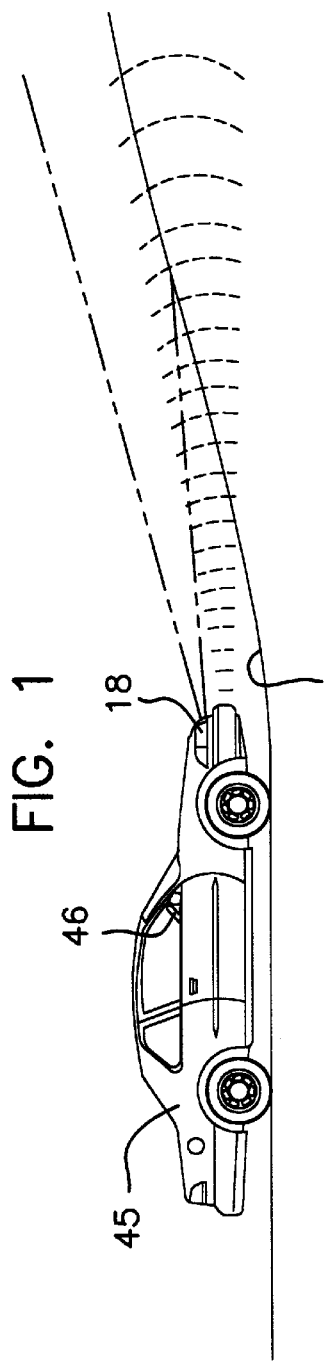
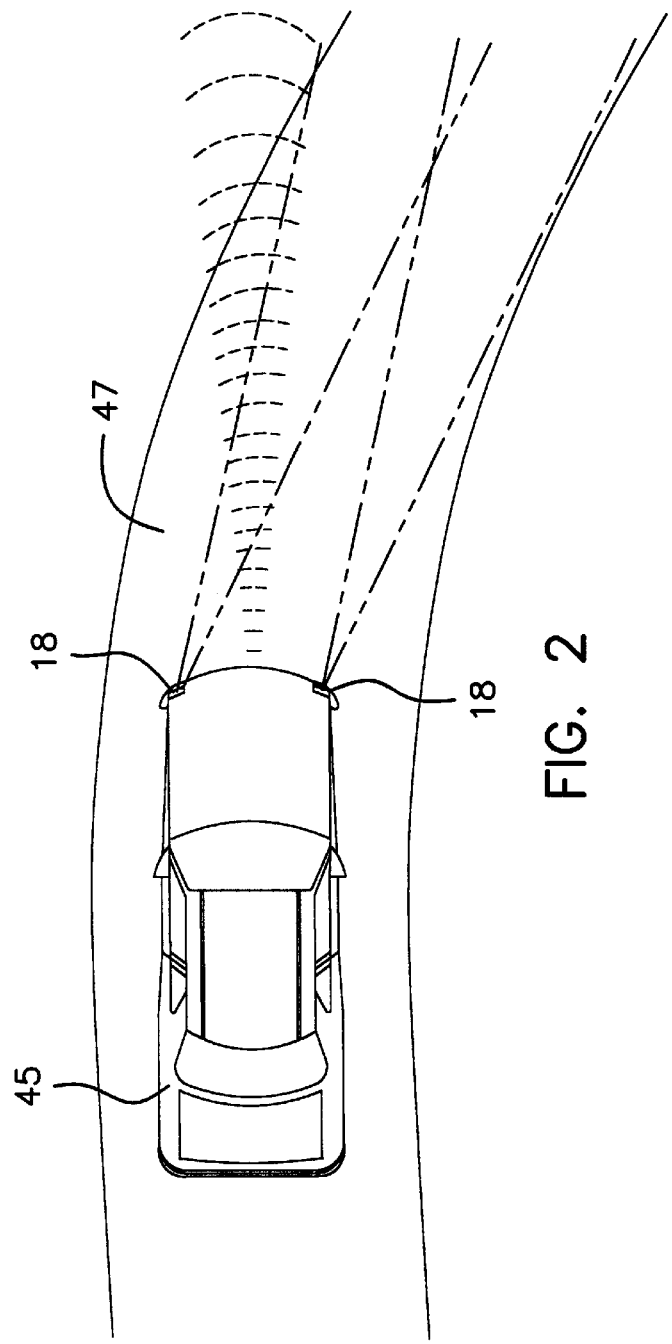

MOVABLE VEHICLE HEADLIGHT SYSTEM

BACKGROUND OF THE INVENTION

1. Field of the Invention

The present invention relates to a sensory maneuver-activated road-tracking headlamps and more particularly pertains to a new movable vehicle headlight system for automatically aiming the headlights in the direction of travel regardless of the terrain of the road.

2. Description of the Prior Art

The use of a sensory maneuver-activated road-tracking headlamps is known in the prior art. More specifically, a sensory maneuver-activated road-tracking headlamps heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,868,488; 3,947,680; 5,416,465; 4,943,893; 5,099,400; and 5,909,949.

While these devices fulfill their respective, particular objectives and requirements, the aforementioned patents do not disclose a new movable vehicle headlight system. The inventive device includes base assemblies each including a base member; and also includes headlight assemblies each including a headlight frame being securely mounted upon the base assembly and each including a headlight being pivotally mounted to the headlight frame; and further includes headlight drive assemblies for pivoting the headlight according to a terrain of a road being driven upon; and also includes a control unit assembly for controlling the headlight drive assemblies.

In these respects, the movable vehicle headlight system according to the present invention substantially departs from the conventional concepts and designs of the prior art, and in so doing provides an apparatus primarily developed for the purpose of automatically aiming the headlights in the direction of travel regardless of the terrain of the road.

SUMMARY OF THE INVENTION

In view of the foregoing disadvantages inherent in the known types of sensory maneuver-activated road-tracking headlamps now present in the prior art, the present invention provides a new movable vehicle headlight system construction wherein the same can be utilized for automatically aiming the headlights in the direction of travel regardless of the terrain of the road.

The general purpose of the present invention, which will be described subsequently in greater detail, is to provide a new movable vehicle headlight system which has many of the advantages of the sensory maneuver-activated road-tracking headlamps mentioned heretofore and many novel features that result in a new movable vehicle headlight system which is not anticipated, rendered obvious, suggested, or even implied by any of the prior art sensory maneuver-activated road-tracking headlamps, either alone or in any combination thereof.

To attain this, the present invention generally comprises base assemblies each including a base member; and also includes headlight assemblies each including a headlight frame being securely mounted upon the base assembly and each including a headlight being pivotally mounted to the headlight frame; and further includes headlight drive assemblies for pivoting the headlight according to a terrain of a road being driven upon; and also includes a control unit assembly for controlling the headlight drive assemblies.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new movable vehicle headlight system which has many of the advantages of the sensory maneuver-activated road-tracking headlamps mentioned heretofore and many novel features that result in a new movable vehicle headlight system which is not anticipated, rendered obvious, suggested, or even implied by any of the prior art sensory maneuver-activated road-tracking headlamps, either alone or in any combination thereof.

It is another object of the present invention to provide a new movable vehicle headlight system which may be easily and efficiently manufactured and marketed.

It is a further object of the present invention to provide a new movable vehicle headlight system which is of a durable and reliable construction.

An even further object of the present invention is to provide a new movable vehicle headlight system which is susceptible of a low cost of manufacture with regard to both materials and labor, and which accordingly is then susceptible of low prices of sale to the consuming public, thereby making such movable vehicle headlight system economically available to the buying public.

Still yet another object of the present invention is to provide a new movable vehicle headlight system which provides in the apparatuses and methods of the prior art some of the advantages thereof, while simultaneously overcoming some of the disadvantages normally associated therewith.

Still another object of the present invention is to provide a new movable vehicle headlight system for automatically aiming the headlights in the direction of travel regardless of the terrain of the road.

Yet another object of the present invention is to provide a new movable vehicle headlight system which includes base assemblies each including a base member; and also includes headlight assemblies each including a headlight frame being securely mounted upon the base assembly and each including a headlight being pivotally mounted to the headlight frame; and further includes headlight drive assemblies for pivoting the headlight according to a terrain of a road being driven upon; and also includes a control unit assembly for controlling the headlight drive assemblies.

Still yet another object of the present invention is to provide a new movable vehicle headlight system that relieves some of the tension and anxiety of driving at night.

Even still another object of the present invention is to provide a new movable vehicle headlight system that would prevent many unnecessary accidents because the headlights are always directed upon the road.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevational view of a vehicle using a new movable vehicle headlight system according to the present invention.

FIG. 2 is a top plan view of a vehicle using the present invention.

DESCRIPTION OF THE PREFERRED EMBODIMENT

Figure 3:
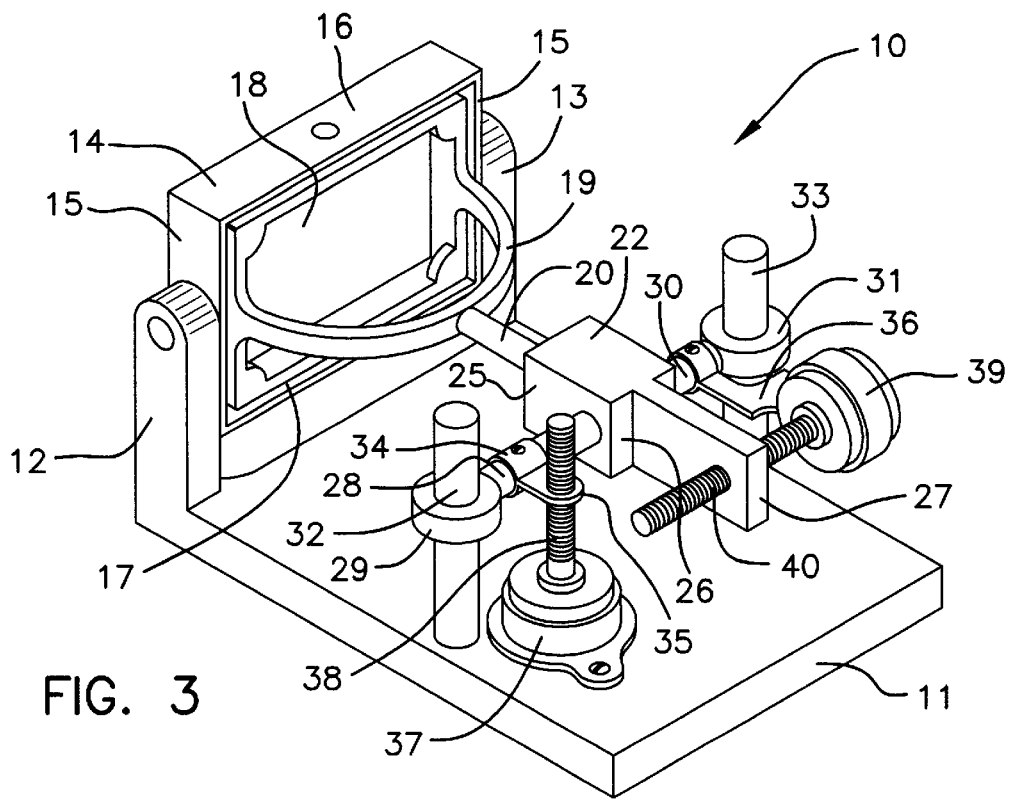
FIG. 3 is a perspective view of one of the base assemblies and one of the headlight drive assemblies of the present invention.
Figure 4:
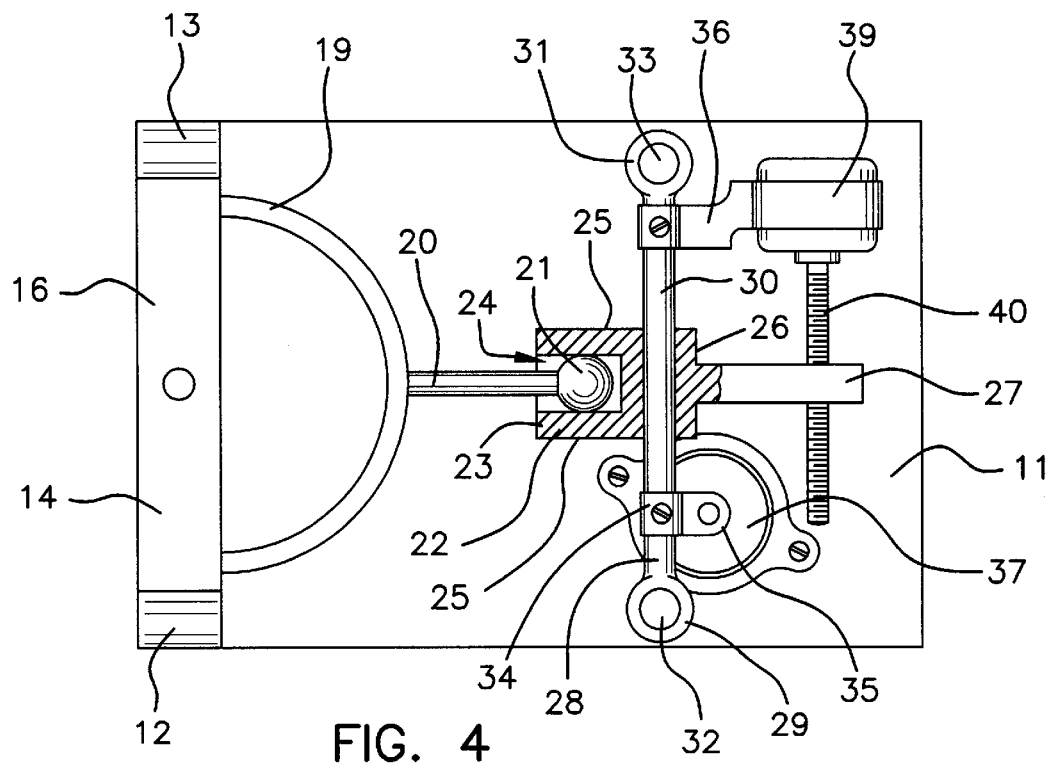
FIG. 4 is a top plan view of one of the base assemblies and one of the headlight drive assemblies of the present invention.
Figure 5:
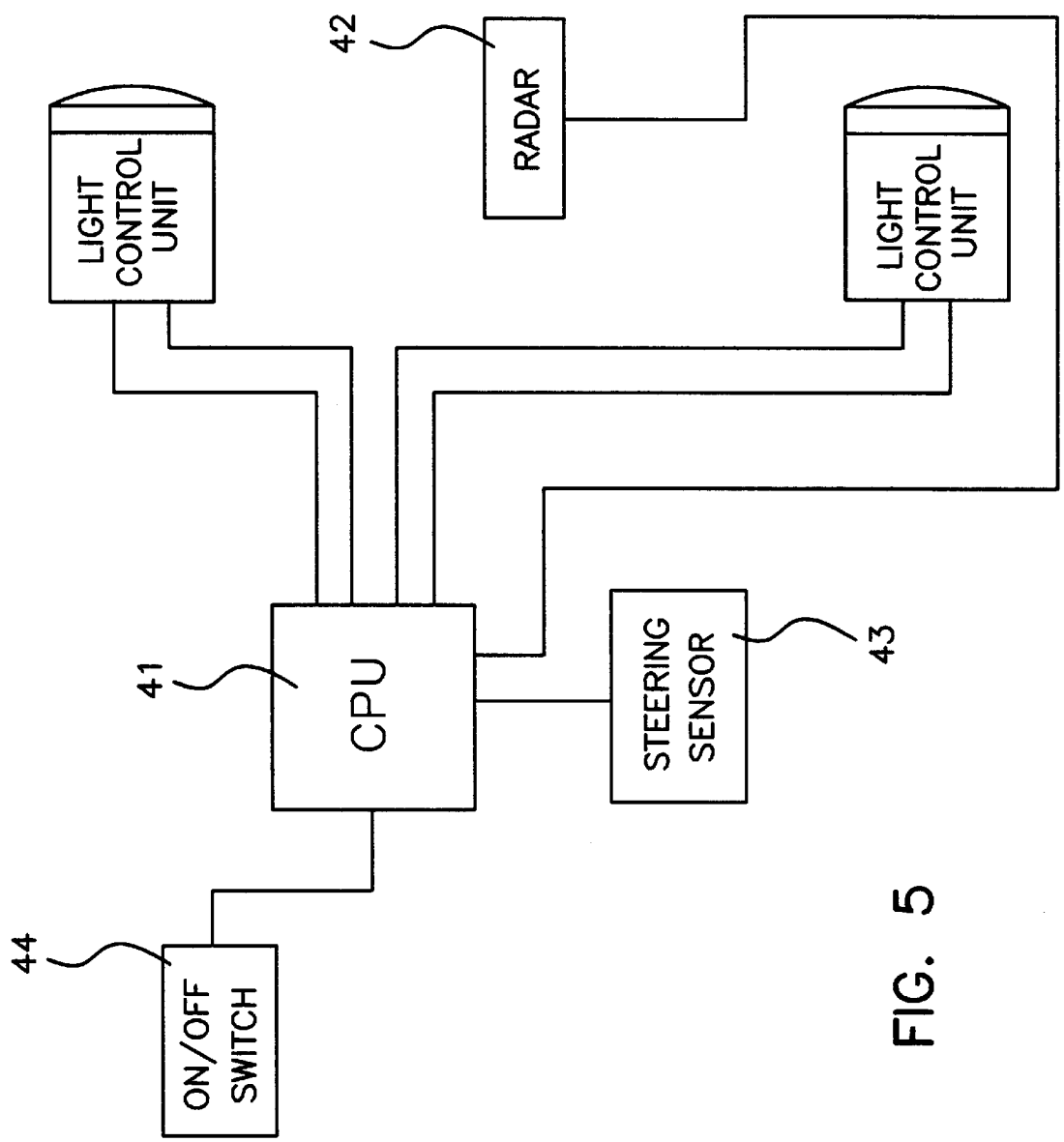
FIG. 5 is a schematic diagram of the present invention.

With reference now to the drawings, and in particular to FIGS. 1 through 5 thereof, a new movable vehicle headlight system embodying the principles and concepts of the present invention and generally designated by the reference numeral 10 will be described.

As best illustrated in FIGS. 1 through 5, the movable vehicle headlight system 10 generally comprises base assemblies each including a base member 11. Each of the base assemblies also includes elongate frame support members 12,13 being spaced apart and being securely and conventionally attached to and extending outwardly from a respective base member 11.

The movable vehicle headlight system 10 also comprises headlight assemblies each including a headlight frame 14 being securely and conventionally mounted upon a respective base member 11 and each including a headlight 18 being pivotally and conventionally mounted to the headlight frame 14. Each of the headlight frames 14 has side members 15 which are pivotally attached to respective elongate frame support members 12,13 and which are pivotable about a horizontal axis. Each of the headlights 18 is pivotally mounted to a top member 16 and a bottom member 17 of a respective headlight frame 14 and is pivotable about a vertical axis.

The movable vehicle headlight assembly 10 further comprises headlight drive assemblies for pivoting the headlights 18 according to a terrain of a road 47 being driven upon. Each of the headlight drive assemblies includes a steering assembly having a bracket member 19 which is securely and conventionally attached to a respective headlight 18, and also having a steering arm 20 being securely and conventionally attached to the bracket member 19, and further having a steering arm support member 22 being removably and conventionally attached to the steering arm 20. Each of the headlight drive assemblies also includes a pair of elongate steering guide members 32,33 being spaced apart and being securely and conventionally attached upon a respective base member 11 and supporting a respective steering arm support member 22. Each of the headlight drive assemblies further includes servo motors 37,39 being conventionally connected to a respective steering arm support member 22 for pivoting a respective headlight 18 about its vertical axis and its horizontal axis depending upon the terrain of the road 47. Each of the steering arm support members 22 includes a main portion having a socket 24 disposed in a front 23 thereof, and also includes a plurality of appendages 27,28,30 extending outwardly from the main portion. The appendages 27,28,30 include a first appendage 27 which extends outwardly from a back 26 of the main portion, and also includes second 28 and third 30 appendages extending outwardly from either side 25 of the main portion. Each of the second and third appendages 28,30 has an eyelet end portion 29,31 which is movably disposed about a respective elongate steering guide member 32,33. Each of the headlight drive assemblies also includes second and third bracket members 34,36 conventionally mounted to the second and third appendages 28,30 with the second bracket member 34 having an eyelet 35 extending therethrough. The servo motors 37,39 of a respective headlight drive assembly include a first servo motor 37 and a second servo motor 39 both of which have threaded shafts 38,40 with the first servo motor 37 being securely and conventionally attached upon a respective base member 11 and with the second servo motor 39 being securely and conventionally mounted to a respective third bracket member 36. The threaded shaft 38 of the first servo motor 37 being threaded through the eyelet 35 of a respective second bracket member 34 for pivoting a respective headlight 18 about its horizontal axis. The threaded shaft 40 of the second servo motor 39 is threaded through a respective first appendage 27 for pivoting a respective headlight 18 about its vertical axis. The steering arm 20 of a respective headlight drive assembly has a ball-like first end 21 which is removably and securely received in the socket 24 of a respective the steering arm support member 22.

A control unit assembly for controlling the headlight drive assemblies includes a central processing unit 41 having a switch 44 and being conventionally connected to the headlight drive assemblies, and also includes a radar member 42 being conventionally connected to the central processing unit 41 and being adapted to be mounted to a vehicle 45 for checking the terrain of the road 47, and further includes a steering wheel sensor 43 being conventionally connected to the central processing unit 41 for determining the turning direction of a steering wheel 46 of the vehicle 45.

In use, as the user drives along a road 47, the radar member 42 will pick up the peaks, valleys, and dips in the road 47 and will send a signal to the central processing unit 41 which will energize the first servo motors 37 so that the headlights 18 will pivot up and down about their horizontal axes accordingly, and as the user turns the steering wheel 46, the steering wheel sensor 43 will signal the central processing unit 41 which will energize the second servo motors 39 to pivot the headlights 18 in the direction of the turning vehicle 45.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A movable vehicle headlight system comprising:

a pair of base assemblies each comprising a base member and a pair of elongate frame support members;

a headlight assembly mounted on each of said base assemblies, each of said headlight assemblies including a headlight frame being pivotally mounted on said elongate frame support members of a respective said base assembly, each of said headlight assemblies including a headlight being pivotally mounted to said headlight frame;

a headlight drive assembly mounted on each of said base assemblies, each of said headlight drive assemblies pivoting said headlight with respect to said base assembly and said headlight frame as a terrain of a road being driven upon changes;

a control unit assembly for controlling said headlight drive assemblies being electrically coupled to each of said headlight drive assemblies;

wherein each of said headlight drive assemblies includes a steering assembly having a bracket member attached to a respective said headlight, a steering arm being securely attached to said bracket member, and a steering arm support member being removably attached to said steering arm; and wherein each of said headlight drive assemblies also includes a pair of elongate steering guide members being spaced apart and being attached upon a respective said base member and supporting a respective said steering arm support member, wherein each of said steering guide members are oriented substantially perpendicular to said base member and substantially parallel with respect to each other.

2. A movable vehicle headlight system as described in claim 1, wherein said pair of elongate frame support members is located adjacent to an end of each of said base members, each of said elongate frame support members is mounted on said base member in a substantially perpendicular manner, and is oriented substantially parallel with respect to a each other.

3. A movable vehicle headlight system as described in claim 2, wherein each of said headlight frames has side members which are pivotally attached to respective said elongate frame support members such that said headlight frames are pivotable about a horizontal axis.

4. A movable vehicle headlight system as described in claim 1, wherein each of said headlights is pivotally mounted to a top member and a bottom member of a respective said headlight frame such that each of said headlights is pivotable about a vertical axis.

5. A movable vehicle headlight system as described in claim 1, wherein each of said headlight drive assemblies further includes servo motors being connected to a respective said steering arm support member for pivoting a respective said headlight about its vertical axis and its horizontal axis depending upon the terrain of the road.

6. A movable vehicle headlight system as described in claim 5, wherein each of said steering arm support members includes a main portion having a socket disposed in a front thereof, and also includes a plurality of appendages extending outwardly from said main portion, said appendages including a first appendage which extends outwardly from a back of said main portion, and also including second and third appendages extending outwardly from either side of said main portion, each of said second and third appendages having an eyelet end portion which is movably disposed about a respective said elongate steering guide member.

7. A movable vehicle headlight system as described in claim 6, wherein each of said headlight drive assemblies also includes second and third bracket members mounted to said second and third appendages, said second bracket member having an eyelet extending through said second bracket member.

8. A movable vehicle headlight system as described in claim 7, wherein said servo motors of a respective said headlight drive assembly includes a first servo motor and a second servo motor both of which have threaded shafts with said first servo motor being securely attached upon a respective said base member and with said second servo motor being securely mounted to a respective said third bracket member, said threaded shaft of said first servo motor being threaded through said eyelet of a respective said second bracket member for pivoting a respective said headlight about its horizontal axis, said threaded shaft of said second servo motor being threaded through a respective said first appendage for pivoting a respective said headlight about its vertical axis.

9. A movable vehicle headlight system as described in claim 8, wherein said steering arm of a respective said headlight drive assembly has a ball-like first end which is removably and securely received in said socket of a respective said steering arm support member.

10. A movable vehicle headlight system as described in claim 9, wherein said control unit assembly includes a central processing unit being connected to said headlight drive assemblies, and also includes a radar member connected to said central processing unit and being adapted to be mounted to a vehicle for determining the terrain of the road, and further includes a steering wheel sensor being connected to said central processing unit for determining turning direction of a steering wheel of the vehicle.

11. A movable vehicle headlight system comprising:

a pair of base assemblies each comprising a base member and a pair of elongate frame support members;

a headlight assembly mounted on each of said base assemblies, each of said headlight assemblies including a headlight frame being pivotally mounted on said elongate frame support members of a respective said base assembly, each of said headlight assemblies including a headlight being pivotally mounted to said headlight frame;

a headlight drive assembly mounted on each of said base assemblies, each of said headlight drive assemblies pivoting said headlight with respect to said base assembly and said headlight frame as a terrain of a road being driven upon changes;

a control unit assembly for controlling said headlight drive assemblies being electrically coupled to each of said headlight drive assemblies;

wherein said pair of elongate frame support members is located adjacent to an end of each of said base members, each of said elongate frame support members is mounted on said base member in a substantially perpendicular manner and, is oriented substantially parallel with respect to each other;

wherein each of said headlight frames has side members which are pivotally attached to respective said elongate frame support members and which are pivotable about a horizontal axis;

wherein each of said headlights is pivotally mounted to a top member and a bottom member of a respective said headlight frame and is pivotable about a vertical axis; and wherein each of said headlight drive assemblies also includes a pair of elongate steering guide members being spaced apart and being attached upon a respective said base member and supporting a respective said steering arm support member, wherein each of said steering guide members are oriented substantially perpendicular to said base member and substantially parallel with respect to each other.

12. A movable vehicle headlight system as described in claim 11, wherein each of said headlight drive assemblies further includes servo motors being connected to a respective said steering arm support member for pivoting a respective said headlight about its vertical axis and its horizontal axis depending upon the terrain of the road.

13. A movable vehicle headlight system as described in claim 12, wherein each of said steering arm support members includes a main portion having a socket disposed in a front thereof, and also includes a plurality of appendages extending outwardly from said main portion, said appendages including a first appendage which extends outwardly from a back of said main portion, and also including second and third appendages extending outwardly from either side of said main portion, each of said second and third appendages having an eyelet end portion which is movably disposed about a respective said elongate steering guide member.

14. A movable vehicle headlight system as described in claim 13, wherein each of said headlight drive assemblies also includes second and third bracket members mounted to said second and third appendages, said second bracket member having an eyelet extending through said second bracket member.

15. A movable vehicle headlight system as described in claim 14, wherein said servo motors of a respective said headlight drive assembly includes a first servo motor and a second servo motor both of which have threaded shafts with said first servo motor being securely attached upon a respective said base member and with said second servo motor being securely mounted to a respective said third bracket member, said threaded shaft of said first servo motor being threaded through said eyelet of a respective said second bracket member for pivoting a respective said headlight about its horizontal axis, said threaded shaft of said second servo motor being threaded through a respective said first appendage for pivoting a respective said headlight about its vertical axis.

16. A movable vehicle headlight system as described in claim 15, wherein said steering arm of a respective said headlight drive assembly has a ball-like first end which is removably and securely received in said socket of a respective said steering arm support member.

17. A movable vehicle headlight system as described in claim 16, wherein said control unit assembly includes a central processing unit being connected to said headlight drive assemblies, and also includes a radar member connected to said central processing unit and being adapted to be mounted to a vehicle for determining the terrain of the road, and further includes a steering wheel sensor being connected to said central processing unit for determining turning direction of a steering wheel of the vehicle.

18. A movable vehicle headlight system comprising:

a pair of base assemblies each comprising a base member and a pair of elongate frame support members;

a headlight assembly mounted on each of said base assemblies, each of said headlight assemblies including a headlight frame being pivotally mounted on said elongate frame support members of a respective said base assembly, each of said headlight assemblies including a headlight being pivotally mounted to said headlight frame;

a headlight drive assembly mounted on each of said base assemblies, each of said headlight drive assemblies pivoting said headlight with respect to said base assembly and said headlight frame as a terrain of a road being driven upon changes;

a control unit assembly for controlling said headlight drive assemblies being electrically coupled to each of said headlight drive assemblies;

wherein said pair of elongate frame support members is located adjacent to an end of each of said base members, each of said elongate frame support members is mounted on said base members in a substantially perpendicular manner, and is oriented substantially parallel with respect to each other;

wherein said headlight frames has side members which are pivotally attached to respective said elongate frame support members such that said headlight frames are pivotable about a horizontal axis;

wherein each of said headlights is pivotally mounted to a top member and a bottom member of a respective said headlight frame such that each of said headlights is pivotable about a vertical axis;

wherein each of said headlight drive assemblies includes a steering assembly having a bracket member attached to a respective said headlight, a steering arm being securely attached to said bracket member, and a steering arm support member being removably attached to said steering arm;

wherein each of said headlight drive assemblies also includes a pair of elongate steering guide members being spaced apart and being securely attached upon a respective said base member and supporting a respective said steering arm support member;

wherein each of said headlight drive assemblies further includes servo motors being connected to a respective said steering arm support member for pivoting a respective said headlight about its vertical axis and its horizontal axis depending upon the terrain of the road;

wherein each of said steering arm support members includes a main portion having a socket disposed in a front thereof, and also includes a plurality of appendages extending outwardly from said main portion, said appendages including a first appendage which extends outwardly from a back of said main portion, and also including second and third appendages extending outwardly from either side of said main portion, each of said second and third appendages having an eyelet end portion which is movably disposed about a respective said elongate steering guide member;

wherein each of said headlight drive assemblies also includes second and third bracket members mounted to said second and third appendages, said second bracket member having an eyelet extending through said second bracket member;

wherein said servo motors of a respective said headlight drive assembly includes a first servo motor and a second servo motor both of which have threaded shafts with said first servo motor being securely attached upon a respective said base member and with said second servo motor being securely mounted to a respective said third bracket member, said threaded shaft of said first servo motor being threaded through said eyelet of a respective said second bracket member for pivoting a respective said headlight about its horizontal axis, said threaded shaft of said second servo motor being threaded through a respective said first appendage for pivoting a respective said headlight about its vertical axis;

wherein said steering arm of a respective said headlight drive assembly has a ball-like first end which is removably and securely received in said socket of a respective said steering arm support member; and wherein said control unit assembly includes a central processing unit being connected to said headlight drive assemblies, and also includes a radar member connected to said central processing unit and being adapted to be mounted to a vehicle for determining the terrain of the road, and further includes a steering wheel sensor being connected to said central processing unit for determining turning direction of a steering wheel of the vehicle.

* * * * *